Figure 1:
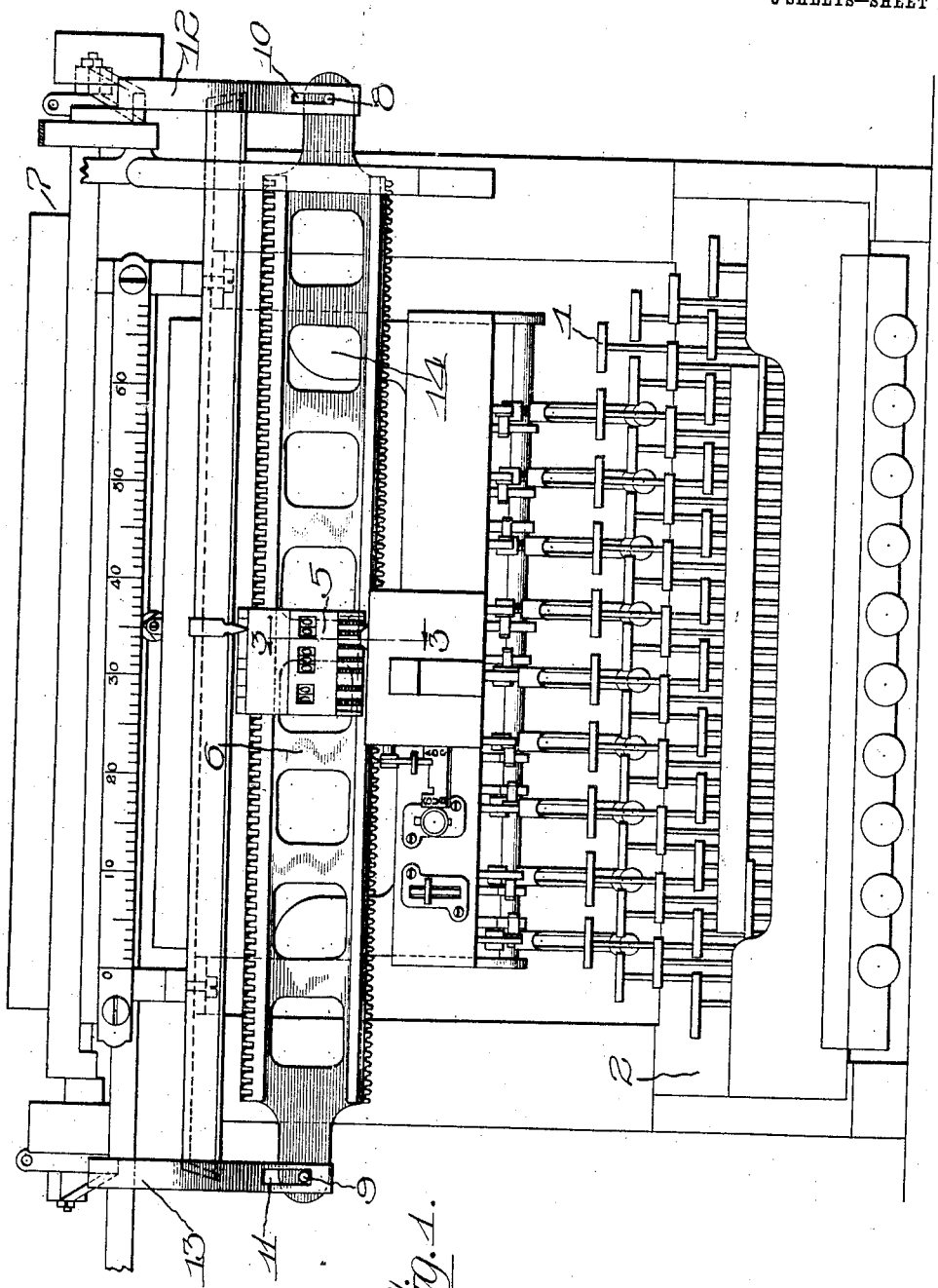

B. R. WEBSTER.
CALCULATING MACHINE.
APPLICATION FILED OCT. 9, 1908.

968,103.

Patented Aug. 23, 1910.
3 SHEETS—SHEET 1.

Witnesses:
Ira D. Perry
G. V. Domarus Jr.

Inventor:
Bester R. Webster
By: Hyman E. Goldberg
Atty.

B. R. WEBSTER.
CALCULATING MACHINE.
APPLICATION FILED OCT. 9, 1908.
968,103.
Patented Aug. 23, 1910.
3 SHEETS—SHEET 2.
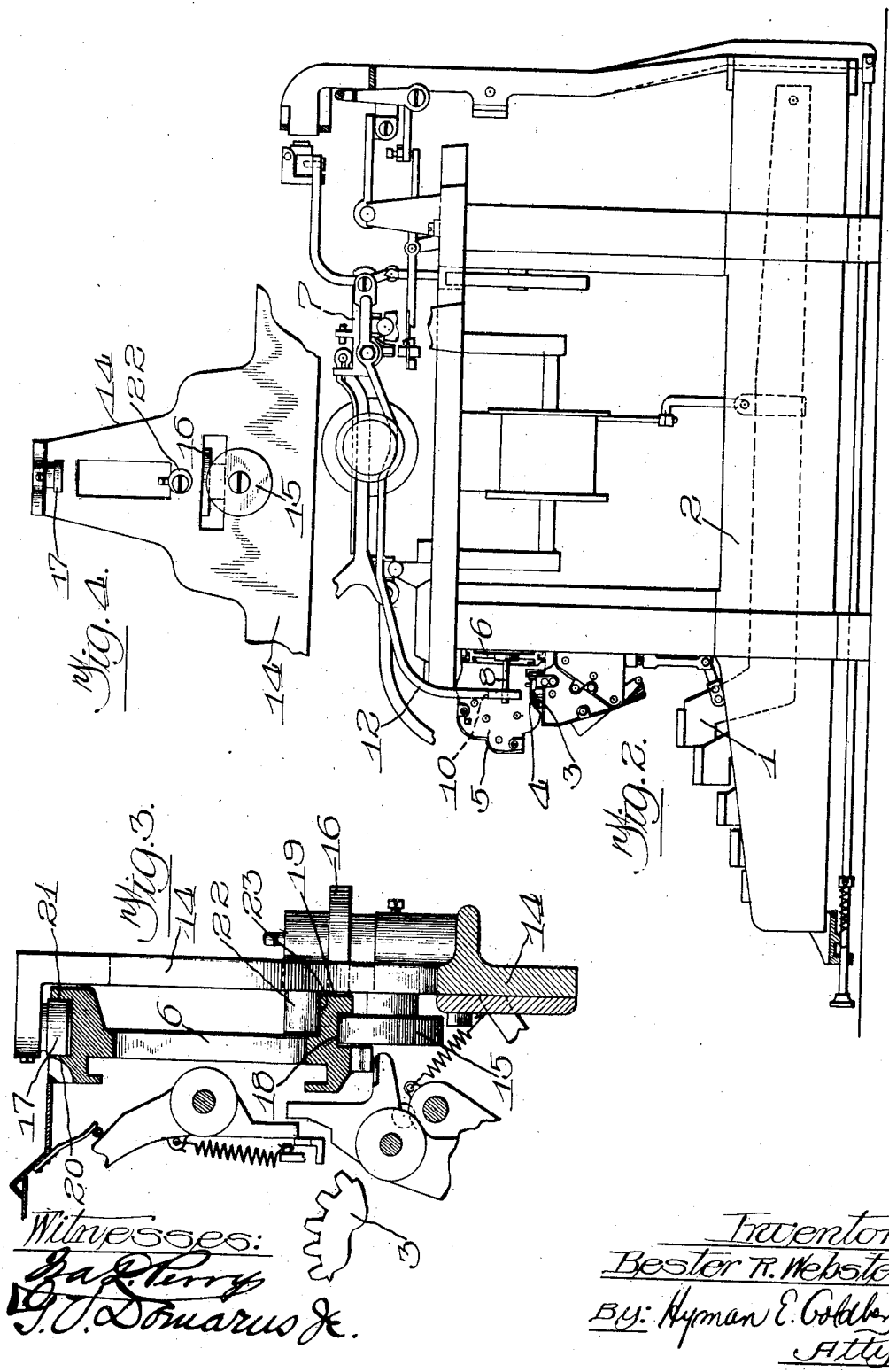

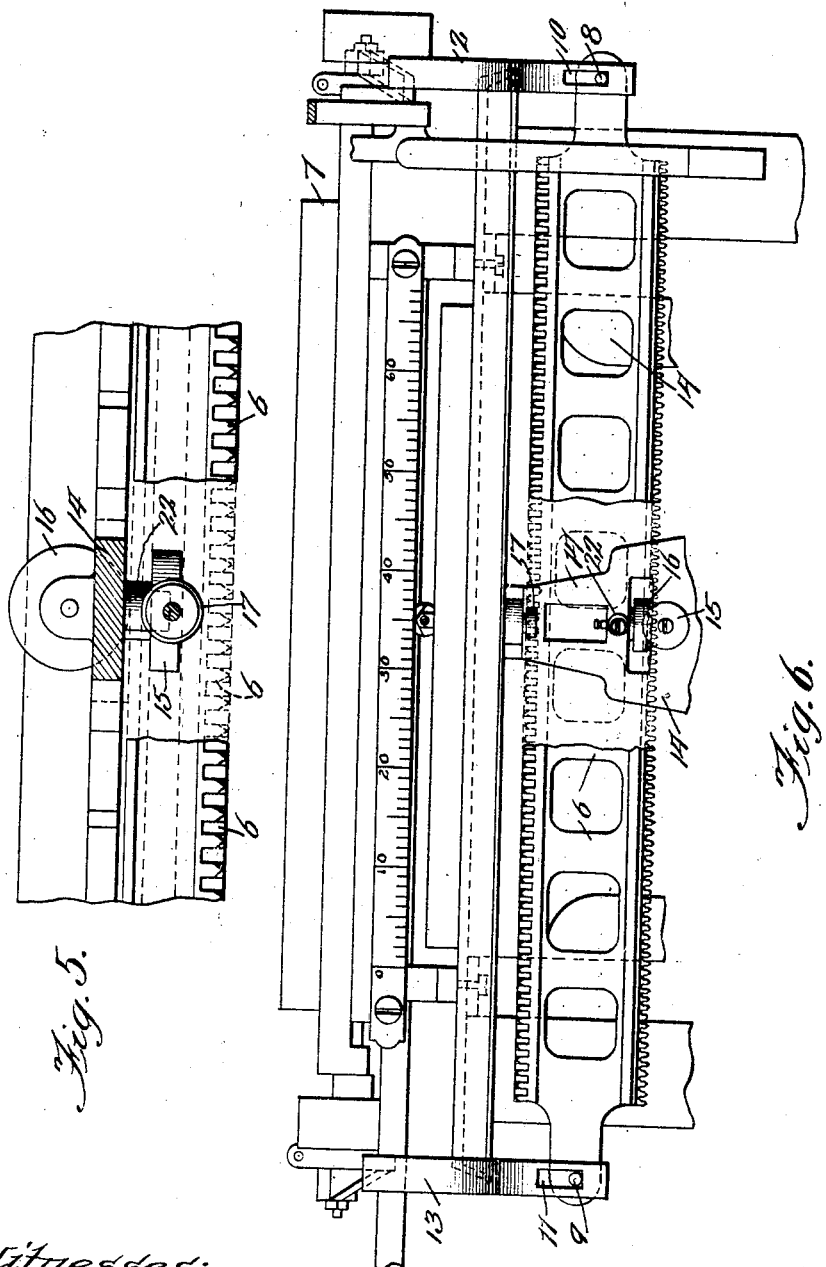

UNITED STATES PATENT OFFICE.

BESTER R. WEBSTER, OF ELGIN, ILLINOIS, ASSIGNOR TO WAHL ADDING MACHINE CO., OF CHICAGO, ILLINOIS.

CALCULATING-MACHINE.

968,103.      Specification of Letters Patent.      Patented Aug. 23, 1910.

Application filed October 9, 1908. Serial No. 456,970.

*To all whom it may concern:*

Be it known that I, BESTER R. WEBSTER, a citizen of the United States, residing at Elgin, in the county of Kane and State of Illinois, have invented a certain new and useful Improvement in Calculating - Machines, of which the following is a specification.

My invention relates to calculating machines, and particularly to calculating attachments to typewriters such as illustrated in Pats. 893718 and 893719. In the attachment there described, there are shown a master wheel suitably operated by the numeral keys of the typewriter, a totalizer, the wheels whereof are rotatable by the master wheel, a truck whereon the totalizer is mounted and by means of which it is carried past the master wheel to permit the meshing of the master wheel and the totalizer wheels, and an arm connecting the truck to the typewriter carriage and causing the advancement of the truck by the motion of the carriage. As there shown, the truck is supported by four rollers on its back engaging the upper and lower ways of a bar which is fastened to the typewriter framework and which also forms a part of the attachment framework. The rollers are distributed in two couples, there being quite a distance between the two couples, and the truck extending quite a distance beyond the rollers.

In actual practice it is convenient to make the totalizer adjustably locatable on the truck so as to be able to calculate columns of figures printed on various portions of the record sheet in the typewriter, and it is also convenient to use more than one totalizer on the truck to thus calculate in a plurality of columns. In order to accomplish either of the above conveniences it has been found necessary to build both the truck and the bar in true prismatic shapes, without any warp to either, so that a totalizer will always properly mesh with the master wheel no matter on which portion of the truck it may be located and no matter on which portion of the bar the truck may be located. Such building of the truck and of the bar in true prismatic shapes is a very difficult piece of mechanical work, and if not impossible it is certainly prohibitive commercially on account of its expense. Moreover for the proper functioning of the machine, the truck and bar must always retain their originally required accuracy and this again is not easily accomplished. For both of these reasons, it seemed highly desirable to so modify the construction of the truck and support therefor, as to permit a small amount of warp in it, without materially affecting the engagement of the master and totalizer wheels, and this I accomplish by the mechanism illustrated in the drawings of which—

Figure 1 is a front elevation of a typewriter, with a calculating attachment mounted thereon; Fig. 2 an end elevation thereof; Fig. 3 a section of the truck and the attachment framework taken along the line 3—3 of Fig. 1, and illustrating the manner of supporting the truck approximately opposite the master wheel, the drawing being to an enlarged scale; and Fig. 4 being a fragmentary front view of the calculating attachment framework showing the rollers for supporting the truck. Fig. 5 is a fragmentary top plan view showing the supporting rollers and truck; and Fig. 6 is a front elevation of the truck and supporting rollers with the totalizer and the bottom portion of the mechanism removed, to more clearly show the parts.

For the purpose of describing this invention, it is not necessary to describe the mechanism in detail, and for such description reference is made to the above cited patents. It is sufficient to point out that the numeral keys 1 of the typewriter 2 are suitably connected to and operate the master wheel 3 which engages and rotates the wheels 4 of the totalizer 5 which is mounted on the truck 6. The truck is supported by pins 8 and 9 fastened into its ends, taking into slots 10 and 11 of the arms 12 and 13 fastened to the back of the typewriter carriage 7, and the truck therefore moves with the carriage during the letter space advance thereof.

Fastened to the framework 14 of the attachment, approximately opposite the master wheel, are a bottom roller 15, a lower back roller 16 and an upper roller 17, on which roll respectively, the lower rollway 18, the lower back rollway 19, and the upper rollways 20 and 21 of the truck. The truck thus has its lower portion prevented from moving downward, or backward, and its upper portion from moving either forward or backward. Since the weight of the truck and the weight of the totalizer thereon tend to tip the truck forward and downward about the bottom roller 15 as a center, the truck is sufficiently supported, but in order to eliminate all possible chance of the lifting of the truck due to say the action of the master wheel upon the wheels of the totalizer, an eccentric disk 22 is mounted on the framework 14 to engage the surface 23 of the truck, and this eccentric disk is adjusted to permit a very slight amount of freedom between the truck and lower roller. Should the truck be lifted, it will be this eccentric disk 22 and not the upper roller 17 which will take the stress, the distance between the upper roller 17 and the adjacent truck surface 24 being greater than the distance between the eccentric disk 22 and the surface 23. By the above rollers located opposite the master wheel that portion of the truck which is opposite the master wheel is properly located and that independently of the proper location of the end of the truck or of the exact prismatic shape of the truck. Thus the truck need not be an exact prism but may have a long curve therein or a gentle warp therein. As long as its cross section is proper it is not necessary that it be straight along its length, and the difficulty of the manufacture thereof is thus vastly lightened.

By the above construction, when a totalizer engages the master wheel, it is held properly in mesh therewith, because the portion of the truck at the operating point is sufficiently properly located.

The rollers supporting the truck have their centers all in one plane and it is found that this permits the truck to pivot about the lower roller as a center to quite an extent before any cramping between the truck and the rollers takes place. The general direction of the truck therefore need not be accurately parallel to the axis of the master wheel, nor need its motion be accurately parallel thereto. This permits the supporting of the truck at its ends by two arms, each of the arms, as before described, preventing its end of the truck from falling, but permitting it to rise. The arms and the bottoms of their slots are so constructed that the truck has bearing on only one arm and pin at a time, namely on the side where the heavier and thus ordinarily longer portion of the truck projects. As the carriage moves and the truck and therefore the totalizer pass to the other side of the master wheel, the truck teeters over and finds a support on the other arm. It is thus not necessary to have the bottoms of the slots in the arms absolutely accurately located, only approximately so. Moreover, in order to prevent any strain in the arms one of the slots 11 is made wide enough so as not to find any side bearing on the pin.

Without limiting myself to the precise construction shown, I claim:

1. In a calculating machine, having a totalizer, a master wheel therefor, a truck for said totalizer, and mechanism for rotating the master wheel, and for advancing the truck to operate the totalizer in its various denominations: a pivotal support for said truck approximately opposite the master wheel; substantially as described.

2. In a calculating machine, having a totalizer, a master wheel therefor, a truck for said totalizer, and mechanism for rotating the master wheel, and for advancing the truck to operate the totalizer in its various denominations: a pivotal support for said truck approximately opposite the master wheel, and another support for the end of the truck, substantially as described.

3. In a calculating machine, having a totalizer, a master wheel therefor, a truck for said totalizer, and mechanism for rotating the master wheel, and for advancing the truck to operate the totalizer in its various denominations: a pivotal support for said truck approximately opposite the master wheel, and another support preventing the end of the truck from dropping but permitting its rising, substantially as described.

4. In a calculating machine, having a totalizer, a master wheel therefor, a truck for said totalizer, and mechanism for rotating the master wheel, and for advancing the truck to operate the totalizer in its various denominations: a pivotal support for said truck approximately opposite the master wheel, and two other supports for the ends of the truck, each of said other supports preventing its coöperating end of the truck from dropping but permitting its rising, substantially as described.

5. In a calculating machine, having a totalizer, a master wheel therefor, a truck for said totalizer, an arm for advancing the truck and mechanism for rotating the master wheel to thus operate the totalizer in its various denominations: a support for said truck approximately opposite the master wheel and a connection between the arm and the end of the truck whereby the arm supports the truck and also advances the same, substantially as described.

6. In a calculating machine, having a totalizer, a master wheel therefor, a truck for said totalizer, an arm for advancing the truck and mechanism for rotating the master wheel to thus operate the totalizer in its various denominations: a support for said truck approximately opposite the master wheel and a pin and slot connection between the arm and the end of the truck whereby the arm prevents the end of the truck from dropping but permits its rising, and whereby the arm also advances the truck, substantially as described.

7. In a calculating machine, having a totalizer, a master wheel therefor, a truck for said totalizer, an arm for advancing the truck and mechanism for rotating the master wheel to thus operate the totalizer in its various denominations: a support for said truck approximately opposite the master wheel and a connection between the arm and the end of the truck, said connection consisting of a pin in one, and a slot in the other, whereby the arm prevents the end of the truck from dropping but permits its rising, and whereby the arm also advances the truck, substantially as described.

8. In a calculating machine, having a totalizer, a master wheel therefor, a truck for said totalizer, and mechanism for rotating the master wheel: two arms for supporting the ends of the truck and for advancing it, both of said arms being operative to support the truck, but only one to advance it, substantially as described.

9. In a calculating machine, having a totalizer, a master wheel therefor, a truck for said totalizer, and mechanism for rotating the master wheel and for advancing the truck to operate the totalizer in its various denominations: a roller mounted approximately opposite the master wheel, said roller serving as a support for the truck to permit its advancement, substantially as described.

10. In a calculating machine, having a totalizer, a master wheel therefor, a truck for said totalizer, and mechanism for rotating the master wheel and for advancing the truck to operate the totalizer in its various denominations: a number of rollers, each mounted approximately opposite the master wheel, said rollers serving as a support for the truck to permit its advancement, substantially as described.

11. In a calculating machine, having a totalizer, a master wheel therefor, a truck for said totalizer, and mechanism for rotating the master wheel, and for advancing the truck thus to operate the totalizer in its various denominational sections, said truck being constantly urged by its own weight and the weight of the totalizer thereon to fall, a friction reducing support preventing the truck from falling and other adjustable supports to prevent the truck from being lifted.

12. In a calculating machine, having a totalizer, a master wheel therefor, a truck for said totalizer, and mechanism for rotating the master wheel and for advancing the truck thus to operate the totalizer, said truck because of its weight and the weight of the totalizer thereon, constantly tending to fall forward and downward, a roller preventing said falling forward and a roller preventing said falling downward and adjustable supports to prevent the truck from being lifted off from said rollers, substantially as described.

13. In a calculating machine, having a totalizer, a master wheel therefor, a truck for said totalizer, and mechanism for rotating the master wheel and for advancing the truck thus to operate the totalizer, a support for the truck approximately opposite the master wheel, said support consisting of a set of rollers to prevent the truck from falling under the action of gravity, and other additional adjustable supports to prevent the truck from being displaced by the action of the master wheel.

14. In a calculating machine, having a totalizer, a master wheel therefor, a truck for said totalizer, and mechanism for rotating the master wheel and for advancing the truck thus to operate the totalizer, said truck because of its own weight and the weight of the totalizer thereon constantly tending to fall forward and downward in its upper portion and forward and backward in its lower portion, a support for said truck, said support including a roller to prevent the truck from falling downward, another roller to prevent its bottom from moving backward, and another roller to prevent its top from falling forward, substantially as described.

15. In a calculating machine, having a totalizer, a master wheel therefor, a truck for said totalizer, and mechanism for rotating the master wheel and for advancing the truck thus to operate the totalizer, said truck because of its own weight and the weight of the totalizer thereon constantly tending to fall forward and downward in its upper portion and forward and backward in its lower portion, a support for said truck, said support including a roller to prevent the truck from falling downward, another roller to prevent its bottom from moving backward, and another roller to prevent its top from falling forward, and other adjustable supports to prevent the truck from being removed from the rollers by the action of the master wheel, substantially as described.

In witness whereof, I have hereunto subscribed my name in the presence of two witnesses.

BESTER R. WEBSTER.

Witnesses:
BURTON O. KING,
EDNA BOTKIN.